(12) United States Patent
Watanabe

(10) Patent No.: US 6,817,191 B2
(45) Date of Patent: Nov. 16, 2004

(54) TEMPERATURE CONTROL DEVICE AND TEMPERATURE CONTROL METHOD, AND INK-JET RECORDING APPARATUS

(75) Inventor: Toshiaki Watanabe, Chiba (JP)

(73) Assignee: SII Printek Inc., Chiba (JP)

( * ) Notice: Subject to any disclaimer, the term of this patent is extended or adjusted under 35 U.S.C. 154(b) by 0 days.

(21) Appl. No.: 10/315,640

(22) Filed: Dec. 10, 2002

(65) Prior Publication Data
US 2003/0133492 A1 Jul. 17, 2003

(30) Foreign Application Priority Data
Jan. 11, 2002 (JP) .......................... 2002-005000

(51) Int. Cl.⁷ .......................... F25B 21/02; F25B 21/00
(52) U.S. Cl. .................. 62/3.7; 62/3.1; 62/3.2
(58) Field of Search ..................... 62/3.1–3.7

(56) References Cited

U.S. PATENT DOCUMENTS

| | | | | |
|---|---|---|---|---|
| 6,125,635 A | * | 10/2000 | Nomura et al. ............... | 62/3.2 |
| 6,185,941 B1 | * | 2/2001 | Watanabe et al. ............ | 62/3.7 |
| 2002/0073716 A1 | | 6/2002 | Melaragni ..................... | 62/3.7 |

FOREIGN PATENT DOCUMENTS

| | | |
|---|---|---|
| DE | 3901377 | 8/1989 |
| JP | 01334645 | 12/2001 |

* cited by examiner

Primary Examiner—William Doerrler
Assistant Examiner—Filip Zec
(74) Attorney, Agent, or Firm—Adams & Wilks

(57) ABSTRACT

To provide a temperature control device and a temperature control method, which are capable of applying temperature control with high accuracy to an object of temperature control and facilitating removal of the object of temperature control to reduce cost at the time of replacement, and an ink-jet recording apparatus.

The temperature control device is provided with a thermoelectric module 2 adhering an object of temperature control to one surface thereof, driving means 7 for flowing a driving current to the thermoelectric module 2, temperature difference detecting means 8 for obtaining a Seebeck voltage generated from a temperature difference between both the surfaces of the thermoelectric module 2 when the driving current is not flowing and outputting a temperature difference signal, temperature detecting means 5 for obtaining a thermoelectromotive force of the other surface of the thermoelectric module 2 and outputting a temperature detection signal, and control means 9 for controlling the driving means so as to bring the object of temperature control to a target temperature from the temperature detection signal and the temperature difference signal.

18 Claims, 13 Drawing Sheets ation of the temperature control device is subjected to
TEMPERATURE CONTROL DEVICE AND TEMPERATURE CONTROL METHOD, AND INK-JET RECORDING APPARATUS

BACKGROUND OF THE INVENTION

1. Field of the Invention

The present invention relates to a temperature control device and a temperature control method that utilize a thermoelectric module to perform temperature control of an object of temperature control such as an ink-jet head, and an ink-jet recording apparatus.

2. Description of the Related Art

In general, in order to control an object of temperature control to remain at a fixed temperature, a temperature control device is used in various apparatuses. As an example of an object that is subject to temperature control by such a temperature control device, for example, an ink-jet head mounted on an ink-jet recording apparatus can be cited.

In the ink-jet head of the ink-jet recording apparatus, temperature changes due to a change in environmental temperature, heat at the time of driving, or the like, and ink filled inside the ink-jet head causes a temperature change. Since a viscosity of the ink in the ink-jet head changes in accordance with this temperature change, a temperature control device for controlling the ink-jet head to a predetermined temperature is provided in order to discharge ink drops from nozzle openings always with an identical ink viscosity to maintain an optimal ink discharge characteristic.

Here, a conventional temperature control device used in an ink-jet head will be described with reference to FIG. 13. Note that FIG. 13 is a schematic block diagram of a temperature control device in accordance with the prior art.

As shown in FIG. 13, one surface of a thermoelectric module 302 is air-tightly adhered and fixed with satisfactory heat conduction to an ink-jet head 301 of an ink-jet recording apparatus as an object of temperature control. A radiator (or heat sink) 303 is air-tightly adhered and fixed with satisfactory heat conduction to the other surface of the thermoelectric module 302 in the same manner.

In addition, a temperature sensor 304 is attached to the ink-jet head 301. This temperature sensor 304 is connected to a temperature detection unit 305 and outputs temperature information of the ink-jet head 301 to a control unit 306 from the temperature detection unit 305.

Here, the control unit 306 controls a driving unit 307 according to a temperature difference between a temperature of the ink-jet head 301 and a target temperature, thereby controlling a driving current flown to the thermoelectric module 302 to cause the thermoelectric module 302 to perform heating or cooling drive and control the temperature of the ink-jet head 301 to be the target temperature.

As described above, in the conventional temperature control device, the temperature sensor 304 is attached to an object of temperature control to measure a temperature, and the thermoelectric module 302 is air-tightly adhered and fixed to the object of temperature control to adjust an amount of its driving current, whereby a temperature of the object of temperature control is controlled to be a target temperature.

In the above-mentioned conventional temperature control device, since an object of temperature control is subjected to temperature control with high accuracy using a thermoelectric module, it is necessary to detect a temperature of the object of temperature control accurately. For this purpose, a temperature sensor has to be attached with satisfactory heat conduction in a place where a temperature of the object of temperature control can be detected accurately. In addition, the thermoelectric module has to be air-tightly adhered and fixed with satisfactory heat conduction to the object of temperature control.

However, if the thermoelectric module is air-tightly adhered and fixed with satisfactory heat conduction to the object of temperature control consisting of an ink-jet head or the like and the temperature sensor is further attached, since a place for attaching the temperature sensor is limited depending on a form and a dimension of the object of temperature control, the temperature sensor cannot be air-tightly adhered and fixed, with satisfactory heat conduction to, a place where a temperature can be detected accurately. Consequently, there is a problem in that a temperature of the object of temperature control cannot be detected accurately by the temperature sensor and the object of temperature control cannot be subjected to temperature control with high accuracy.

In this way, when temperature control of the object of temperature control cannot be performed with high accuracy, if the object of temperature control is an ink-jet head, there is a problem in that temperature control of ink in the ink-jet head cannot be performed with high accuracy by the temperature control device and a printing quality degrades.

Moreover, in order to prevent influence of an ambient temperature or influence of condensation, the temperature control device may be formed in a closed structure depending on an object of temperature control. However, there is a problem in that a place for attaching the temperature sensor is further limited by forming the temperature control device in a closed structure, a place for detecting a temperature accurately is eliminated, and a thermal resistance is further increased, so that target temperature control of high accuracy cannot be performed.

In particular, if the object of temperature control is an ink-jet head, since a difference between a temperature at the time when it is used and a temperature at the time when it is not used is large, condensation appears evidently, and the temperature control device may be formed in a closed structure in order to prevent influence of an ambient temperature and condensation. However, since a place for attaching the temperature sensor is further limited by forming the temperature control device in a closed structure and the temperature sensor cannot be air-tightly adhered and fixed with satisfactory heat conduction to the ink-jet head, there is a problem in that an ink temperature cannot be controlled to be a target temperate with high accuracy because a temperature cannot be detected accurately.

In addition, in an object of temperature control that is detachably attachable to an apparatus main body in order to replace the object of temperature control due to failure or the like, in the case where it is desired to reuse a temperature sensor, there is a problem in that, if the temperature sensor is attached to the object of temperature control, the temperature sensor has to be removed from the object of temperature control and the removal takes a long time.

In particular, in the case of an ink-jet head, the ink-jet head is replaced due to failure, wear or the like of it, and the ink-jet head itself is constituted to be detachably attachable to an apparatus main body. There is a problem in that, if a temperature sensor is attached to the ink-jet head, the temperature sensor is removed from the ink-jet head in order to reuse it and the removal takes time.

SUMMARY OF THE INVENTION

In view of such circumstances, it is an object of the present invention to provide a temperature control device and a temperature control method that are capable of applying temperature control of high accuracy to an object of temperature control and facilitating removal of the object of temperature control to reduce costs at the time of replacement, and an ink-jet recording apparatus.

A first aspect of the present invention for solving the above-mentioned problems resides in a temperature control device that is characterized by including a thermoelectric module having an object of temperature control air-tightly adhered to its one surface; driving means for flowing a driving current to the thermoelectric module; temperature difference detecting means for obtaining a Seebeck voltage, which is generated from a temperature difference on both the surfaces of the thermoelectric module when the driving current is not flowing, to output a temperature difference signal; temperature detecting means for outputting a temperature detection signal based on a signal of a temperature sensor that is thermally coupled to the other surface of the thermoelectric module; and controlling means for controlling the driving means so as to set the object of temperature control to a target temperature according to the temperature detection signal and the temperature difference signal.

A second aspect of the present invention resides in a temperature control device that is characterized by further including, in the first aspect, switching means for alternately switching a connection state of the thermoelectric module and the driving means and a connection state of the thermoelectric module and the temperature difference detecting means.

A third aspect of the present invention resides in a temperature control device that is characterized in that, in the first or second aspect, the controlling means controls an amount and a direction of the driving current that the driving means supplies to the thermoelectric module.

A fourth aspect of the present invention resides in a temperature control device that is characterized in that, in any one of the first to third aspects, the object of temperature control is an ink-jet head.

A fifth aspect of the present invention resides in a temperature control device that is characterized in that, in any one of the first to fourth aspects, a radiator is air-tightly adhered to the other surface of the thermoelectric module.

A sixth aspect of the present invention resides in a temperature control device that is characterized in that, in any one of the first to fifth aspects, a P-type thermoelectric element and an N-type thermoelectric element are connected in series or in serial parallel in the thermoelectric module.

A seventh aspect of the present invention resides in an ink-jet recording apparatus that is characterized by including the temperature control device in any one of the first to sixth aspects.

An eighth aspect of the present invention resides in a temperature control method for having an object of temperature control air-tightly adhered to one surface of a thermoelectric module, and at the same time, flowing a driving current to the thermoelectric module to control the object of temperature control to a target temperature, which is characterized by including detecting a temperature of the other surface of the thermoelectric module while obtaining a temperature difference from Seebeck voltage generated from a temperature difference between one surface and the other surface of the thermoelectric module brought into a state where the driving current is not flown; and controlling a temperature of the object of temperature control to a target temperature by controlling a direction and an amount of the driving current flown to the thermoelectric module according to the temperature difference between one surface and the other surface of the thermoelectric module and the temperature of the other surface.

A ninth aspect of the present invention resides in a temperature control method that is characterized in that, in the eighth aspect, the detection of the temperature difference of the thermoelectric module and the supply of the driving current to the thermoelectric module are alternately repeated.

A tenth aspect of the present invention resides in a temperature control method that is characterized in that, in the eighth or ninth aspect, the object of temperature control is an ink-jet head.

An eleventh aspect of the present invention resides in a temperature control method that is characterized in that, in any one of the eighth to tenth aspects, a radiator is air-tightly adhered to the other surface of the thermoelectric module.

A twelfth aspect of the present invention resides in a temperature control method that is characterized in that, in any one of the eighth to eleventh aspects, a P-type thermoelectric element and an N-type thermoelectric element are connected in series or in serial parallel in the thermoelectric module.

In such an invention, temperature control with high accuracy can be applied to an object of temperature control, and at the same time, removal of the object of temperature control is facilitated to thereby reduce costs at the time of replacement.

BRIEF DESCRIPTION OF THE DRAWINGS

For a more better understanding of the present invention, reference is made of a detailed description to be read in conjunction with the accompanying drawings, in which.

DETAILED DESCRIPTION OF THE PREFERED EMBODIMENT

The present invention will be hereinafter described in detail based on various preferred embodiments.

(First Embodiment)

In this embodiment, assuming that an object of temperature control is an ink-jet head used in an ink-jet recording apparatus, a temperature control device for controlling a temperature of the ink-jet head in which ink is filled, that is, a temperature of ink, to a target temperature will be described.

Figure 1:
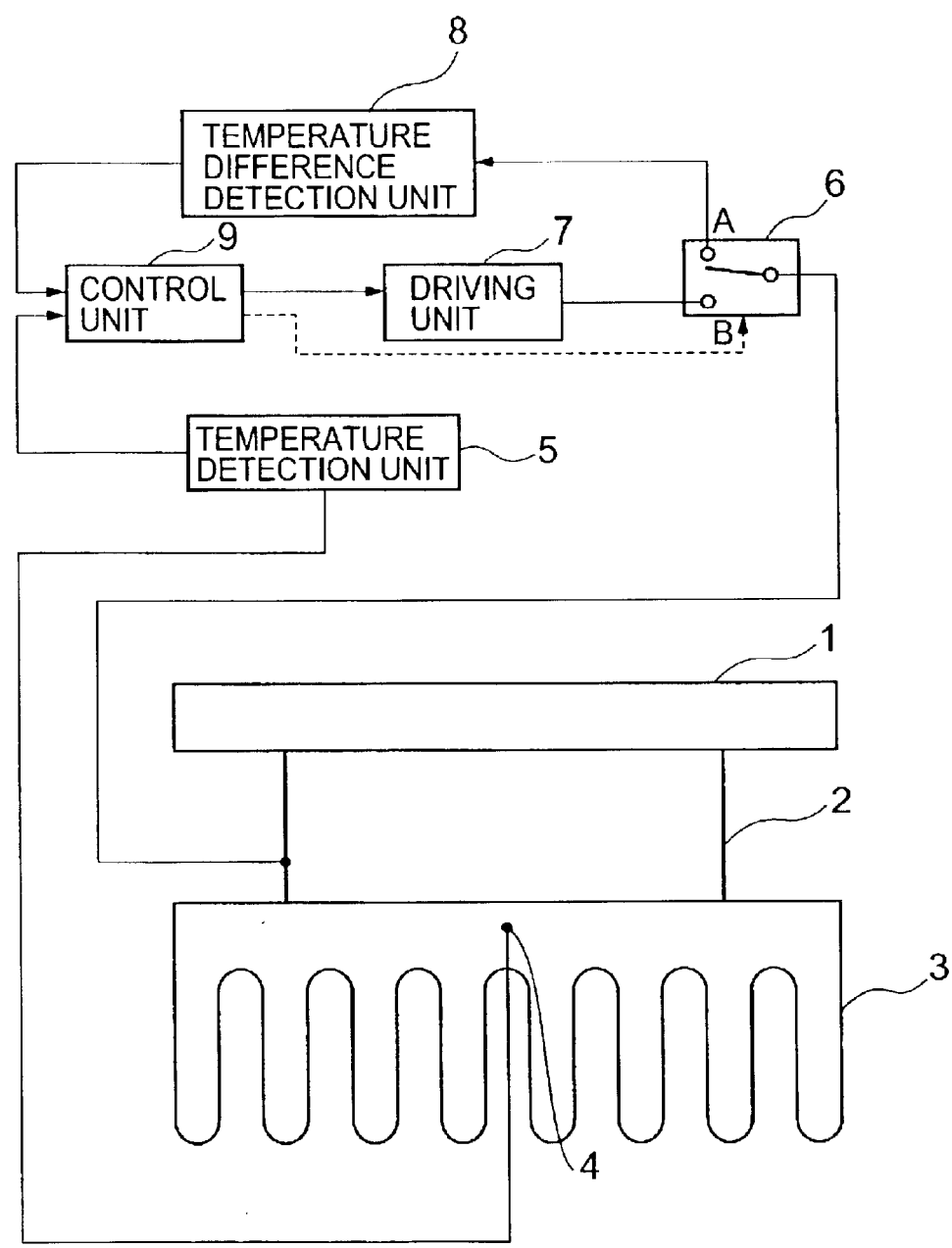
FIG. 1 is a schematic block diagram of a temperature control device in accordance with a first embodiment of the present invention.

FIG. 1 is a schematic block diagram of a temperature control device in accordance with a first embodiment. The temperature control device will be hereinafter described in detail based on FIG. 1.

As shown in FIG. 1, the temperature control device of the first embodiment is provided with a thermoelectric module 2 that is air-tightly adhered and fixed to an ink-jet head 1 to be an object of temperature control and a radiator (or heat sink) 3 that is fixed on a surface of the thermoelectric module 2 on the opposite side of the ink-jet head 1, and at the same time, provided with a temperature sensor 4 and a temperature detection unit 5 connected to the temperature sensor 4 as temperature detecting means for detecting a temperature on the radiator 3 of the thermoelectric module 2. In addition, a driving unit 7 and a temperature difference detection unit 8 are connected switchably with respect to each other to the thermoelectric module 21 via a switching unit 6. Moreover, a control unit 9 for controlling the driving unit 7 and the temperature difference detection unit 8 is provided.

Here, the thermoelectric module 2 functions as a so-called Peltier element by supplying a driving current to heat or cool the ink-jet head 1 in this case, and for example, is a thermoelectric module in which a P-type thermoelectric element and an N-type thermoelectric element are connected in series or in serial parallel. In addition, the thermoelectric module 2 also functions as a Seebeck element, which generates a Seebeck voltage by a temperature difference between a surface to which the ink-jet head 1 is air-tightly adhered and a surface on which the radiator 3 is provided, if it does not supply a driving current.

Therefore, in the present invention, attention is paid to such functions of the thermoelectric module 2, and the thermoelectric module 2 is switchably used as a Peltier element and a Seebeck element. That is, the temperature control device of the present invention has a temperature control mode in which the thermoelectric module 2 is connected to the driving unit 7 via the switching unit 6 and receives supply of an electric current from the driving unit 7 to operate to heat or cool the ink-jet head 1 and a temperature difference detection mode in which the thermoelectric module 2 is connected to the temperature difference detection unit 8 via the switching unit 6 and generates a Seebeck voltage according to a temperature difference of both the surfaces on the ink-jet head 1 side and the radiator 3 side. Further, both the modes are alternately switched at predetermined timing by the switching unit 6 that is controlled by the control unit 9.

Here, in the temperature difference detection mode, the control unit 9 obtains temperature difference information between the ink-jet head 1 side and the radiator 3 side of the thermoelectric module 2 from a signal outputted by the temperature difference detection unit 8 based on a Seebeck voltage generated by the thermoelectric module 2, and on the other hand, the control unit 9 obtains temperature information on the radiator 3 side from the temperature detection unit 5. The control unit 9 obtains a temperature of the ink-jet head 1 by adding the temperature on the radiator 3 side and the temperature difference on both the sides of the thermoelectric module 2.

On the other hand, in the temperature control mode, the control unit 9 controls the driving unit 7 to supply a predetermined current to the thermoelectric module 2 according to a difference between the temperature of the ink-jet head 1 obtained in the temperature difference detection mode and a target temperature of the ink-jet head 1 to control the ink-jet head 1 to the predetermined target temperature.

As described above, the temperature control device of this embodiment has an ink-jet head 1 adhered in an airtight manner and fixed to one surface of the thermostatic module 2 as an object of temperature control and the temperature sensor 4 attached with satisfactory heat conduction to the other surface, adds a temperature on the other surface obtained from the temperature sensor 4 and a temperature difference between both the surfaces of the thermoelectric module 2, obtains a temperature on one surface of the thermoelectric module 2, that is, a temperature of the ink-jet head 1, flows a driving current to the thermoelectric module 2 based on the temperature and controls the temperature of the ink-jet head 1 to be a target temperature with high accuracy.

Further, the radiator 3 is not limited specifically as long as it facilitates radiation of heat from the surface of the thermoelectric module 2 on the opposite side of the ink-jet head 1, and in general, is an aluminum member with an enlarged surface area. However, the thermoelectric module 2 may be joined to a member having satisfactory heat conduction of the printer apparatus main body without providing the radiator 3.

In addition, the temperature detecting means consisting of the temperature sensor 4 and the temperature detection unit 5 is not limited specifically as long as it can measure a temperature of the surface of the thermoelectric module 2 on the opposite side of the ink-jet head 1. For example, the temperature detecting means may be a thermistor element and its resistance value detection circuit or a non-contact type sensor such as an infrared ray sensor. It is preferable to use one in which the temperature sensor 4 such as thermocouple can be air-tightly adhered and fixed with satisfactory heat conduction in the vicinity of the radiator 3, preferably of the thermoelectric module 2. As the temperature detection unit 5, one that detects temperature information on the other surface of the thermoelectric module 2 by a signal obtained from the temperature sensor 4 is sufficient. Further, although it is preferable to provide the temperature sensor 4 in the radiator 3 from the viewpoint of attachment, it may be directly fixed to the thermoelectric module 2.

Moreover, although the temperature detection unit 5, the switching unit 6, the driving unit 7, the temperature difference detection unit 8 and the control unit 9 can be realized by an electric circuit as described below, it is needless to mention that a part or all of them are realized also by a microcomputer or the like. Further, in this case, the switching unit 6 does not need to be an electric switch but may be any switch as long as it can substantially switch the temperature control mode for supplying a driving voltage to the thermoelectric module 2 and the temperature difference detection mode for not supplying a driving voltage.

Figure 2:
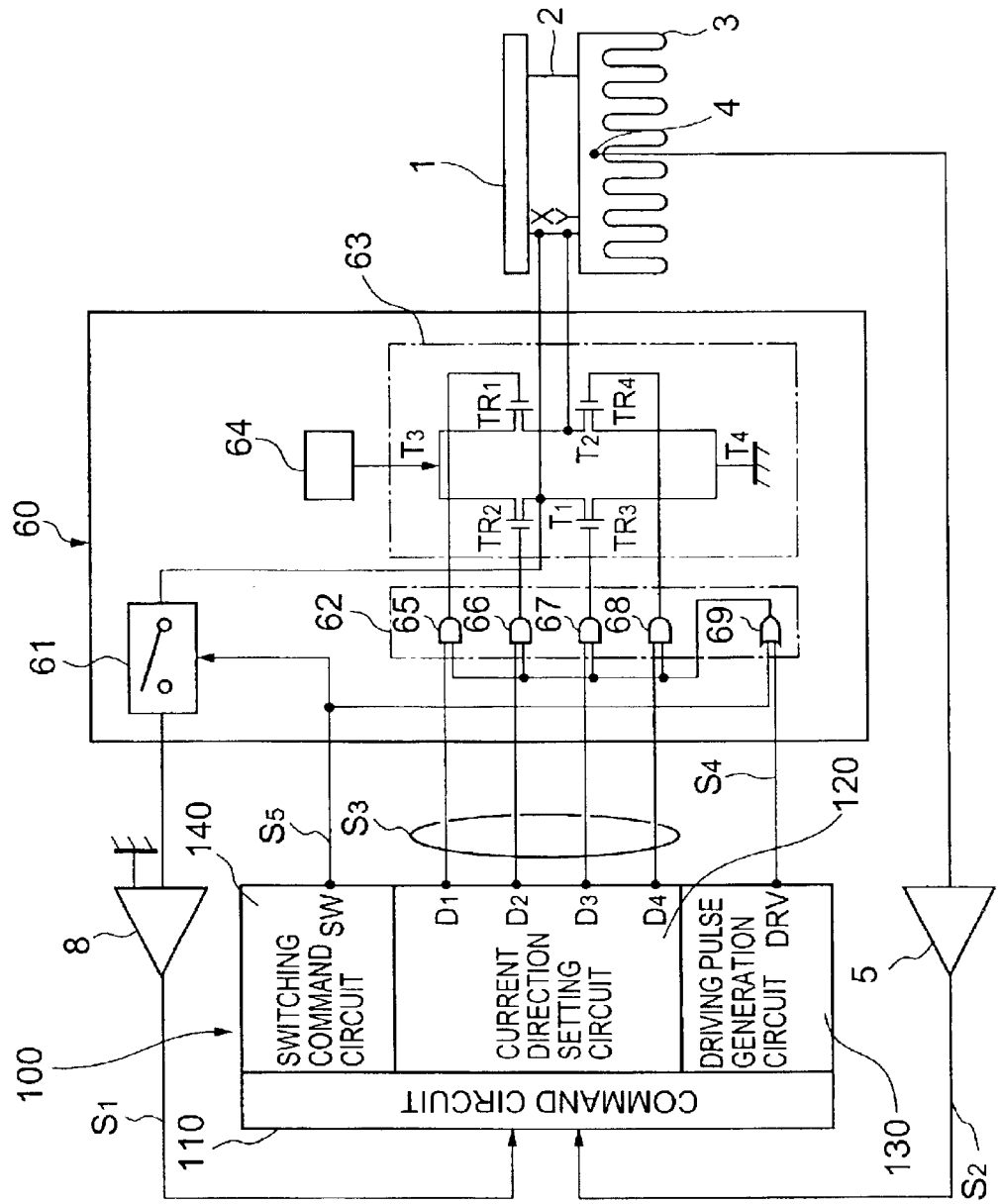
FIG. 2 is a detailed circuit diagram of the temperature control device in accordance with the first embodiment of the present invention.

The temperature control device for controlling a temperature of ink to a target temperature will be hereinafter described in detail based on FIG. 2. Note that FIG. 2 is a detailed circuit diagram that realizes the temperature control device in accordance with the first embodiment by a specific electronic circuit.

As shown in the figure, this electronic circuit is provided with a control circuit 100 consisting of an IC functioning as the above-mentioned driving unit 7 and control unit 9 and a switching unit 60 functioning as the above-mentioned switching unit 6. The control circuit 100 is provided with a command circuit 110 that inputs a temperature difference detection unit 8 and a temperature detection signal $S_2$ outputted from the temperature detection unit 5 to obtain a temperature of the ink-jet head 1 from both the signals $S_1$ and $S_2$ as described in FIG. 1, and at the same time, outputs a command signal by comparing the obtained signal and a target signal, a current direction setting circuit 120 and a driving pulse generation circuit 130 that set a current direction and a pulse width by the command signal from the command circuit 110 such that this obtained temperature of the ink-jet head 1 becomes the target temperature, and a switching command circuit 140 for outputting a switching signal $S_5$ for switching the above-mentioned two modes.

This current direction Betting circuit 120 outputs a current direction setting signal $S_3$ to the switching unit 60 and sets a direction of a driving current supplied to the thermoelectric module 2. That is, when a driving current is supplied in one direction, for example, in a direction from a terminal X to a terminal Y, in the thermoelectric module 2, the surface to which the ink-jet head 1 of the thermoelectric module 2 is air-tightly adhered and fixed is heated, and at the same time, the surface to which the radiator 3 is air-tightly adhered and fixed is cooled. On the other hand, if a driving current is supplied in a reverse direction, for example, a direction from a terminal Y to a terminal X, the surface on the ink-jet head 1 side is cooled and the surface on the radiator 3 side is heated, whereby heat is radiated from the radiator 3.

In addition, the driving pulse generation circuit 130 outputs a driving pulse signal $S_4$ that sets a width of a pulse current flown to the thermoelectric module 2, to the switching unit 60.

Next, the switching unit 60 is constituted by a detection switch 61, a second switching command circuit 62, a switching circuit 63 and a power supply 64.

The second switching command circuit 62 is constituted by four AND circuits 65, 66, 67 and 68 and an OR circuit 69. One input terminal of each AND circuit 65 to 68 is connected to output terminals $D_1$, $D_2$, $D_3$, and $D_4$ of the current direction setting circuit 120, respectively, and all of the other input terminals are connected to an output of the OR circuit 69. In addition, one input terminal of the OR circuit 69 is connected to an output terminal DRV of the driving pulse generation circuit 130; and the input terminal is connected to an output terminal SW of the switching command circuit 140.

In addition, in the switching circuit 63, a bridge circuit is constituted by four transistors $TR_1$, $TR_2$, $TR_3$ and $TR_4$, and a gate terminal of each transistor $TR_1$ to $TR_4$ is connected to an output terminal of each AND circuit 65 to 68 of the switching command circuit 62.

Next, two terminals $T_1$ and $T_2$ on one diagonal line of the bridge circuit of the switching circuit 63 are connected to the terminals X and Y of the thermoelectric module 2, respectively, a terminal $T_3$ on the other diagonal line is connected to the power supply 64, and a terminal $T_4$ is grounded.

Incidentally, the switching command circuit 140 outputs the switching signal $S_5$ to the detection switch 61 to turn ON the detection switch 61, and at the same time, outputs the switching signal $S_5$ to the second switching command circuit 62 as well to temporarily stop a driving current from being supplied to the thermoelectric module 2 and allows the temperature difference detection unit 8 to detect a Seebeck voltage. On the other hand, if the switching command circuit 140 does not output the switching signal $S_5$, a driving current flows to the thermoelectric module 2 as described below.

Here, a circuit operation in the case where the ink-jet head 1 is cooled by the thermoelectric module 2 will be hereinafter described.

In order to flow a driving current for cooling one surface to which the ink-jet head 1 of the thermoelectric module 2 is air-tightly adhered and fixed, first, the switching command circuit 140 does not output the switching signal $S_5$ to turn OFF the detection switch 61.

Then, ON signals and OFF signals are inputted in one input terminals of the AND circuits 65, 66, 67 and 68 from the terminals $D_2$ and $D_4$ and the terminals $D_1$ and $D_3$ of the current direction setting circuit 120, respectively, and the driving pulse signal $S_4$ outputted by the driving pulse generation circuit 130 is inputted in the other input terminals via the OR circuit 69. Consequently, the transistors $TR_1$ and $TR_3$ are always turned OFF and the transistors $TR_2$ and $TR_4$ are turned ON at a predetermined pulse width, a pulse-like driving current flows from the power supply 64, for example, in the direction from the terminal X to the terminal Y of the thermoelectric module 2, the surface of the thermoelectric module 2 on the ink-jet head 1 side is cooled and the ink-jet head 1 is cooled. Further, at this point, the other surface of the thermoelectric module 2 is heated and the radiator 3 radiates heat.

Next, a circuit operation in the case where the ink-jet head 1 is heated will be hereinafter described.

In the case where the ink-jet head 1 is heated by the thermoelectric module 2, the circuit operation is the same as the above-mentioned case of cooling except that a state of the current direction setting signal $S_3$ outputted by the current direction setting circuit 120 is different.

That is, the current direction setting circuit 120 outputs ON signals and OFF signals from the terminals $D_1$ and $D_3$ and the terminals $D_2$ and $D_4$, respectively, the transistors $TR_1$ and $TR_3$ are turned ON at a predetermined pulse width, and the transistors $TR_2$ and $TR_4$ are always turned OFF. Consequently, a pulse-like driving current flows to the terminals of the thermoelectric module 2 in the direction opposite to that in the case of cooling, for example, in the direction from the terminal Y to the terminal X, the surface of the thermoelectric module 2 to which the ink-jet head 1 is air-tightly adhered and fixed is heated, and the surface on the other side to which the radiator 3 is air-tightly adhered and fixed is cooled.

Incidentally, as described above, the temperature control mode for cooling or heating the ink-jet head 1 and the temperature difference detection mode for checking whether or not a temperature of the ink-jet head 1 has reached a predetermined temperature are alternately switched at a predetermined interval.

Here, a circuit operation for detecting a temperature of the ink-jet head 1 will be described in detail.

First, the current direction setting circuit 120 brings the terminals $D_1$, $D_2$ and $D_3$ into the OFF state by the control of the command circuit 110 and outputs an ON signal to one input terminal of the AND circuit 68 only from the terminal $D_4$. In addition, the switching command circuit 140 outputs the switching signal $S_5$ to the OR circuit 69 to prevent the driving pulse signal $S_4$ from passing the OR circuit 69, and at the same time, brings the other input terminal of the AND circuit 68 into the ON state. In this way, only the output terminal of the AND circuit 68 among the AND circuits 65 to 68 comes into the ON state, and the transistors $TR_1$, $TR_2$ and $TR_3$ come into the OFF state and only the transistor $TR_4$ comes into the ON state. In addition, since the switching command circuit 140 also outputs the switching signal $S_5$ to the detection switch 61 simultaneously, the detection switch 61 also comes into the ON state simultaneously.

In this way, the detection switch 61 and the transistor $TR_4$ are brought into the ON state, whereby a Seebeck voltage generated between the terminal X and the terminal Y of the thermoelectric module 2 is applied to the input of the temperature difference detection unit 8, and the temperature difference detection signal $S_1$ is obtained.

A temperature difference between both the surfaces of the thermoelectric module 2 is obtained from the temperature difference detection signal $S_1$ obtained as described above, and further, a temperature on the other surface of the thermoelectric module 2 is obtained from the temperature detection signal $S_2$ obtained by the temperature sensor 4 and the temperature detection unit 5. By adding both of them, a temperature on one surface of the thermoelectric module 2, that is, the ink-jet head 1, can be obtained.

Next, more specific temperature control will be described with reference to FIGS. 3 and 4. Note that FIG. 3 is an operation waveform chart of signals of the temperature control device in accordance with the first embodiment and FIG. 4 is a temperature change graph of an ink-jet head, a radiator and the like of the temperature control device in accordance with the first embodiment.

Figure 3:
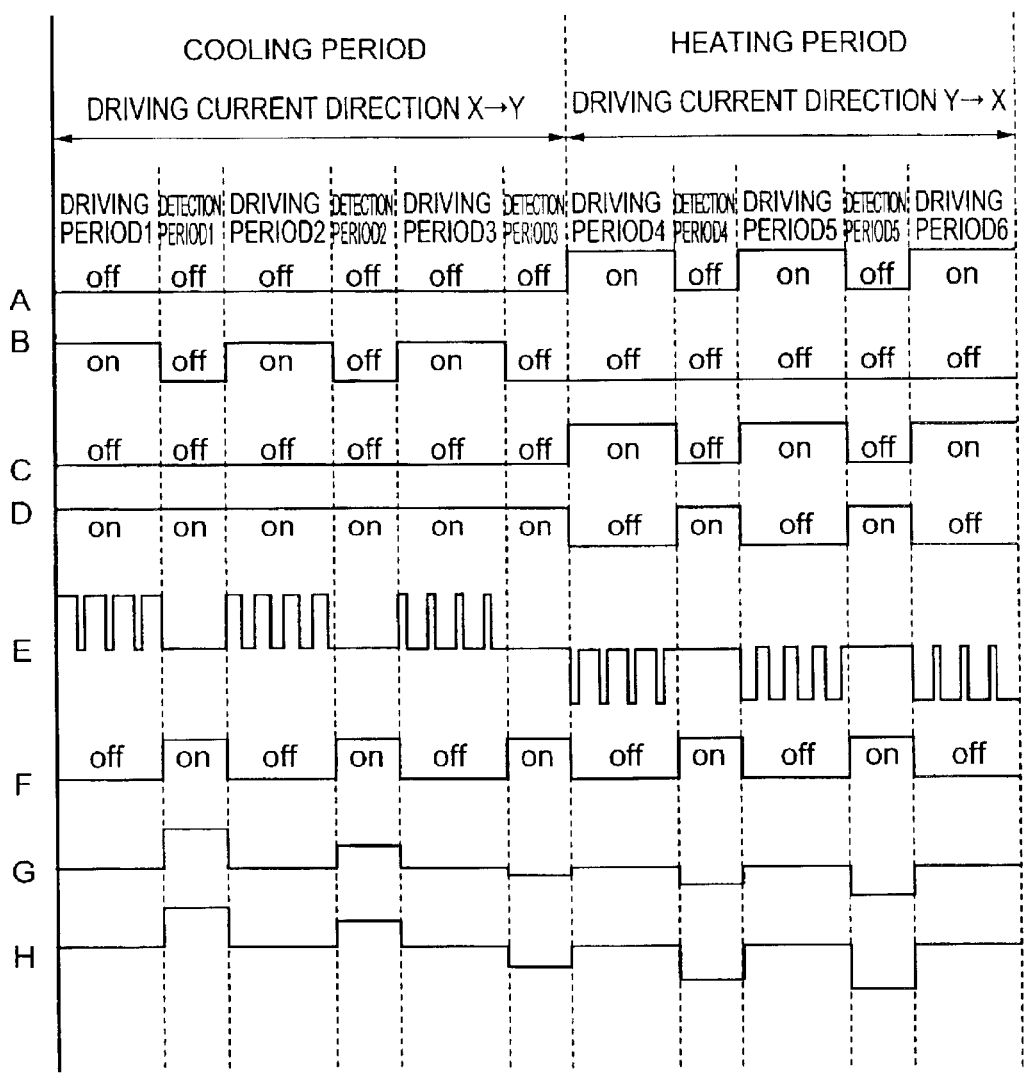
FIG. 3 is an operation waveform diagram of signals of the temperature control device in accordance with the first embodiment of the present invention.
Figure 4:
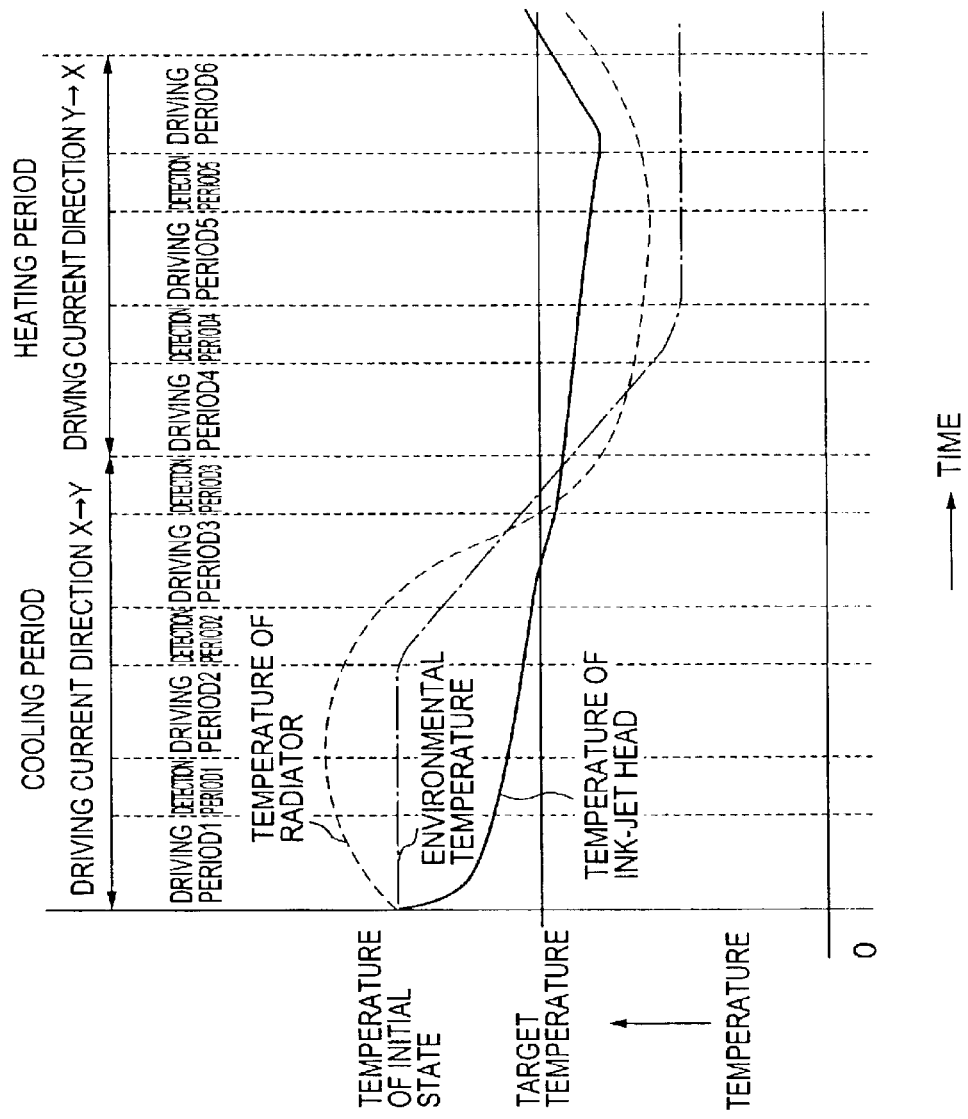
FIG. 4 is a temperature change graph of an ink-jet head, a radiator and the like of the temperature control device in accordance with the first embodiment of the present invention.

In FIGS. 3 and 4, a cooling period is a period in which a driving current is flown, for example, in the direction from the terminal X to the terminal Y of the thermoelectric module 2 to cool the ink-jet head 1 that is an object of temperature control air-tightly adhered and fixed to one surface of the thermoelectric module 2, and is represented as a driving direction X Y. Further, at this point, heat is radiated from the radiator 3 that is air-tightly adhered and fixed to the other surface of the thermoelectric module 2. On the other hand, a heating period is a period in which a driving current is flown in the opposite direction, for example, in the direction from the terminal Y to the terminal X, to heat the ink-jet head 1, and is represented as a driving direction Y X. Further, at this point, the radiator 3 is cooled. In addition, a period in which a driving current is flown to the thermoelectric module 2 is defined as a driving period, and a period in which a Seebeck voltage of the thermoelectric module 2 is detected is defined as a detection period.

Note that, in this embodiment, each driving period and each detection period are assumed to be the same period of time, respectively, but the present invention is not limited to this and a time can be set appropriately. In addition, the cooling period and the heating period are not limited to a fixed period, respectively, and a length of the periods can be appropriately set according to, for example, a difference from a target temperature.

First, an operation waveform chart of signals shown in FIG. 3 will be described. As shown in the figure, signals A, B, C and D correspond to the current direction setting signal $S_3$ outputted from the current direction setting circuit 120, that is, the output terminals $D_1$, $D_2$, $D_3$ and $D_4$, respectively, and are outputted to the AND circuits 65, 66, 67 and 68. Here, a signal is defined as an ON signal if it is outputted and as an OFF signal if it is not outputted. In addition, a waveform E is the driving pulse signal $S_4$ outputted from the driving pulse generation circuit 130 and also corresponds to a driving waveform of a driving current flowing to the thermoelectric module 2.

During the cooling period, in the driving period, the signals A and C are OFF signals and the signals B and D are ON signals, and the waveform E is outputted simultaneously. Consequently, when the waveform E is in the ON state, the transistors $TR_2$ and $TR_4$ are turned ON and the transistors $TR_1$ and $TR_3$ are turned OFF, and a driving current coinciding with a pulse waveform of the waveform E flows from the power supply 64 in the direction of the terminal X to the terminal Y of the thermoelectric module 2. Further, a signal F that is the switching signal $S_5$ from the switching command circuit 140 is an OFF signal.

On the other hand, in the detection period, the signals A, B and C are OFF signals, the signal D is an ON signal and the signal F is an ON signal. Consequently, only the transistor $TR_4$ is turned ON and the detection switch 61 is turned ON simultaneously.

Here, when the detection switch 61 is turned ON, a Seebeck voltage is outputted to the temperature difference detection unit 8, and the temperature difference detection unit 8 outputs the temperature difference detection signal $S_1$ based on this.

A signal G represents a Seebeck voltage outputted from the temperature difference detection unit 8, a signal H represents the temperature difference detection signal $S_1$, which is a signal representing a temperature difference between a temperature of the ink-jet head 1 and a target temperature.

Incidentally, the above-mentioned waveform E is a driving current flowing to the thermoelectric module 2, which flows at the time of the ON state of a pulse and does not flow at the time of the OFF state of a pulse. Therefore, assuming that the driving voltage is constant, an amount of the driving current can be changed by outputting pulses with different duty ratios that are ratios of the ON states of a pulse in the driving period. In the above-mentioned example, the driving period is assumed to be a fixed period, and an amount of the driving current is changed by changing a pulse width while keeping a pulse frequency constant. That is, in the above-mentioned example, a duty ratio of a pulse in the waveform E gradually decreases in the order of the driving period 1, 2 and 3 during the cooling period. This indicates a transition state in which an amount of current flown to the thermoelectric module 2 is gradually restricted and a cooling action of the thermoelectric module 2 is gradually inhibited.

On the other hand, during the heating period, ON and OFF of the signals A to D in the driving period is reversed. Consequently, an electric current flowing to the thermoelectric module 2 flows in the opposite direction and the ink-jet head 1 is heated. Otherwise, the operation is basically identical with that in the cooling period.

FIG. 4 represents a temperature of the ink-jet head 1, a temperature of the radiator 3 and an environmental temperature together with a target temperature in association with the cooling period and the heating period of FIG. 3. In the cooling period, as shown in FIG. 4, if an environmental temperature in which an object of temperature control is placed is higher than a target temperature, since a temperature of the ink-jet head 1 and a temperature of the radiator 3 are the same as the environmental temperature in an initial state before performing temperature control of the ink-jet head 1, the temperature of the ink-jet head 1 is higher than the target temperature and the ink-jet head 1 is cooled.

Thus, based on FIG. 3, in a driving period 1 during the cooling period, a driving current for which a duty ratio of a pulse is set high is flown in the direction from the terminal X to the terminal Y of the thermoelectric module 2, whereby the temperature of the ink-jet head 1 is cooled to be the target temperature, and on the other hand, the temperature of the radiator 3 rises.

In this driving period 1, since the switching signal $S_5$ of the signal F is an OFF signal, the detection switch 61 is OFF, and a Seebeck voltage of the signal G is not detected. Therefore, a signal representing a temperature error of a waveform H is not outputted either.

Next, a driving current is flown in a driving period 1, whereby the temperature of the ink-jet head 1 changes. Thus, the temperature of the ink-jet head 1 is detected as described above in the detection period 1.

As described above, since the ink-jet head 1 is cooled, a value of the signal H representing a temperature difference between the temperature of the ink-jet head 1 and the target temperature becomes smaller than before, and a duty ratio of a pulse of a driving current in a driving period 2 is set smaller than the duty ratio of a pulse in the driving period 1 to further lower the temperature of the ink-jet head 1. Since the signal H representing a temperature error of the detection period 2 is smaller than that in the detection period 1, in a driving period 3, a duty ratio of a pulse of a driving current is set even smaller to further lower the temperature of the ink-jet head 1.

In this way, in the driving period during the cooling period, a driving current is flown to the thermoelectric module 2 to cool the ink-jet head 1, and a duty ratio of a pulse of a driving current flown to the next driving period is set according to the signal H representing a temperature error obtained by detecting a Seebeck voltage in the next detection period. This operation is repeated to control the temperature of the ink-jet head 1 to be the target temperature.

Incidentally, as shown in FIG. 4, since the environmental temperature starts to fall in a short time after the temperature of the ink-jet head 1 reached the target temperature and the temperature of the ink-jet head 1 falls to be lower than the target temperature following it, a polarity of the signal H representing a temperature difference of the driving period 3 appears as an opposite polarity. Thus, the temperature of the ink-jet head 1 has to be raised to the target temperature now. Therefore, the surface of the thermoelectric module 2 to which the ink-jet head 1 is air-tightly adhered and fixed is switched from cooling to heating.

Thus, since a temperature difference between both the surface of the thermoelectric module 2 in the detection periods 4 and 5 gradually increases compared with that in the detection period 3, a value of the signal G that is a Seebeck voltage also gradually becomes larger than that in the detection period 3.

As shown in FIG. 4, since the temperature of the ink-jet head 1 falls to be significantly lower than the target temperature, the signal H representing a temperature error of the detection period 4 has a larger value than the signal H of the detection period 3. Thus, in order to bring the temperature of the ink-jet head 1 closer to the target temperature, a duty ratio of a pulse of a driving current that is the waveform E in the driving period 5 is larger than that in the driving period 4.

Moreover, at the point in time of the detection period 5, as shown in the figure, since the temperature of the ink-jet head 1 is lower than the target temperature, the signal H has a larger value than the signal H of the detection period 4. Therefore, the duty ratio of a pulse of a driving current that is the waveform E is further increased in the driving period 6 to heat the thermoelectric module 2 such that the temperature of the ink-jet head 1 becomes equal to the target temperature. On the other hand, the radiator 3 is cooled to the contrary and changes as shown in the figure.

In this way, the surface of the thermoelectric module 2 on the side where the ink-jet head 1 is air-tightly adhered and fixed is controlled to the target temperature, whereby the temperature of the ink-jet head 1 can be controlled to be the target temperature. Thus, even if a change in the environmental temperature or a temperature change of the ink-jet head 1 due to heat generation of the ink-jet had 1 itself occurs, the ink-jet head 1 can be easily controlled to a predetermined temperature. Therefore, a temperature of ink in the ink-jet head 1 can be kept at a predetermined temperature and a printing quality improves.

Further, although a frequency of a pulse is fixed and a pulse width is changed as means for varying an amount of a driving current in the driving unit 7 in this embodiment, an amount of current may be changed by fixing a pulse width and changing a pulse frequency or changing a driving period or a driving voltage. It is needless to mention that an amount of current may be changed in an analog manner.

Next, an ink-jet head of an ink-jet recording apparatus that is an object to be controlled to a target temperature will be described in detail.

Figure 5:
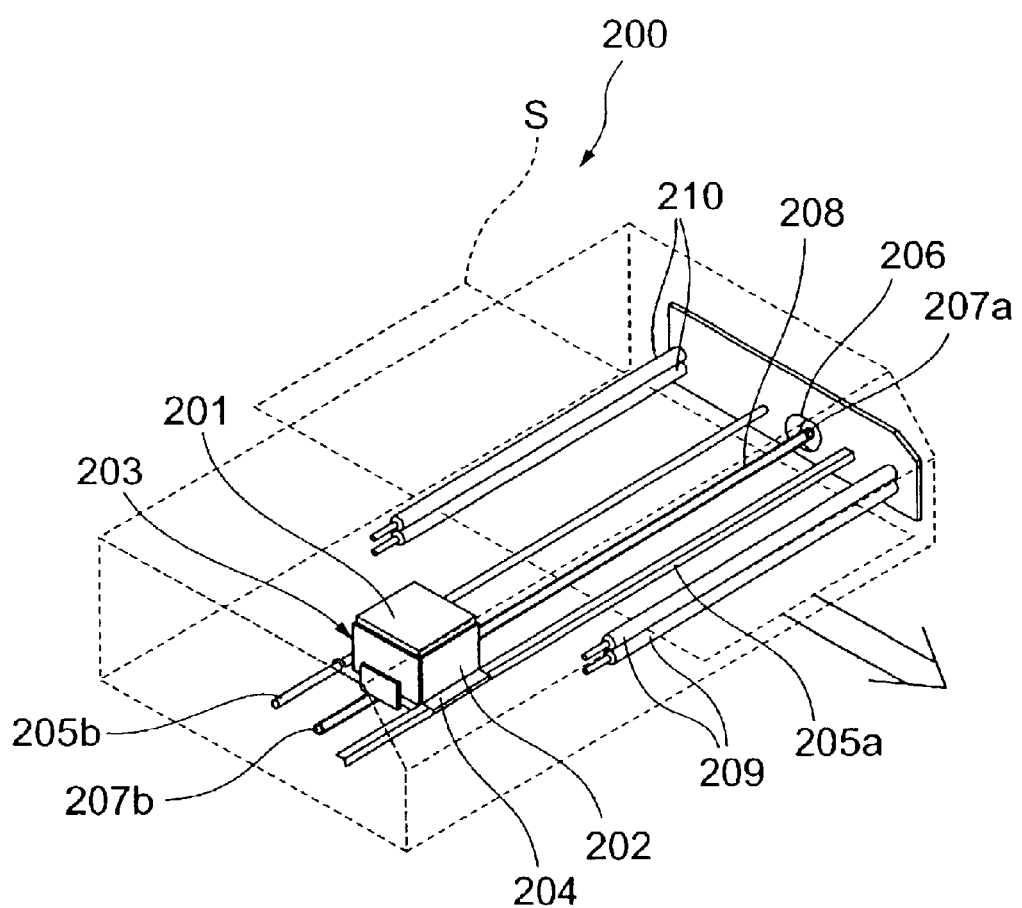
FIG. 5 is a schematic view of an ink-jet recording apparatus in accordance with the first embodiment of the present invention.

FIG. 5 is a schematic view of an ink-jet recording apparatus in accordance with the first embodiment of the present invention. As shown in FIG. 5, an ink-jet recording apparatus 200 of this embodiment is an ink-jet recording apparatus of a serial system in which a head is scanned, a head unit 203 having an ink-jet head 1 for discharging ink and a tank holder 202 for detachably holding an ink cartridge 201 that supplies ink to the ink-jet head 1 via a not-shown ink flow path is fixed to a carriage 204, and this carriage 204 is mounted on a pair of guide rails 205a and 205b movably in their axial directions. In addition, a driving motor 206 is provided on one end side of the guide rails 205a and 205b, and a driving force by this driving motor 206 is moved along a timing belt 208 suspended between a pulley 207a coupled to the driving motor 206 and a pulley 207b provided on the other end side of the guide rails 205 and 205b.

In addition, a pair of conveyance rollers 209 and 210 are provided along the guide rails 205a and 205b, respectively, on both the end sides in a direction perpendicular to a conveying direction of the carriage 204. These conveyance rollers 209 and 210 convey a medium to be recorded S to below the carriage 204 in the direction perpendicular to the conveying direction of the carriage 204.

Then, while feeding the medium to be recorded S by these conveyance rollers 209 and 210, the carriage 204 is scanned in a direction perpendicular to a direction of the feeding, whereby characters, images and the like are recorded on the medium to be recorded S by the ink-jet head 1.

Here, an example of the ink-jet head 1 used in the ink-jet recording apparatus 200 of this embodiment will be described. Note that FIG. 6 is an exploded perspective view showing a schematic structure of an ink-jet head in accordance with the first embodiment, FIG. 7 (FIG. 7A, FIG. 7B) is a perspective view showing a schematic structure of a head chip in accordance with the first embodiment, and FIG. 8 (FIGS. 8A, 8B) is a schematic perspective view of the ink-jet head in accordance with the first embodiment.

Figure 6:
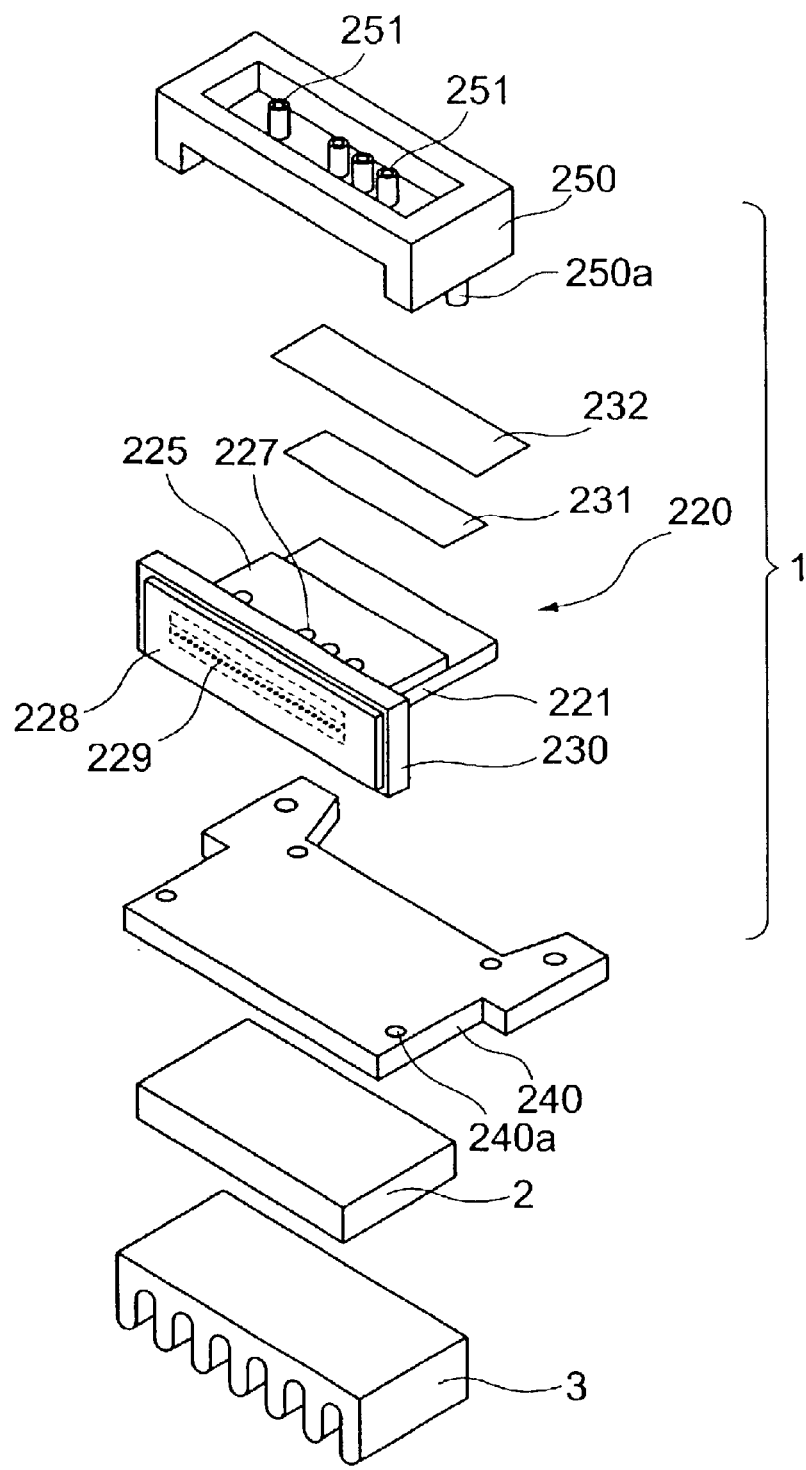
FIG. 6 is a disassembled perspective view showing a schematic structure of an ink-jet head in accordance with the first embodiment of the present invention.

The ink-jet head 1 that is an object of temperature control of this embodiment has a head chip 220, a base plate 240 to be provided on one surface side of this head chip 220 and a cover plate 250 provided on the other surface side of the head chip 220 as shown in FIG. 6.

In addition, the thermoelectric module 2 and the radiator 3 of the temperature control device for holding the ink-jet head 1 at a predetermined temperature are joined one after another on the opposite side of the base plate 240 from the head chip 220.

Figure 7A:
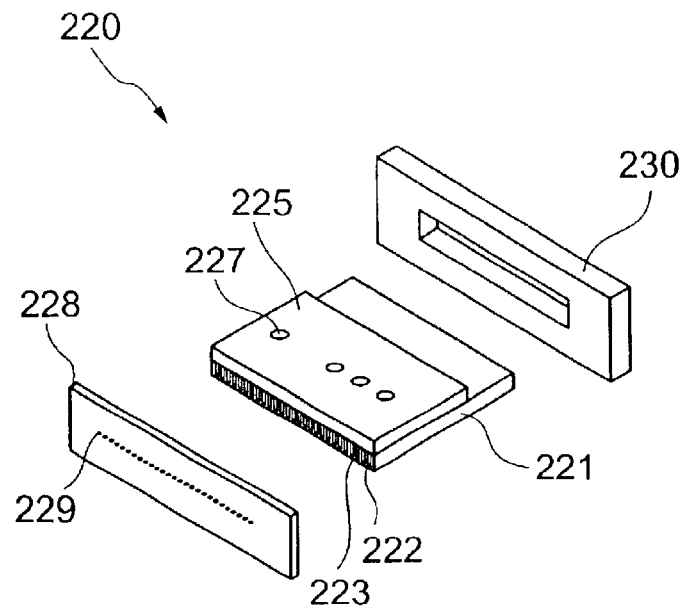
FIGS. 7A and 7B are perspective views showing a schematic structure of a head chip in accordance with the first embodiment of the present invention.
Figure 7B:
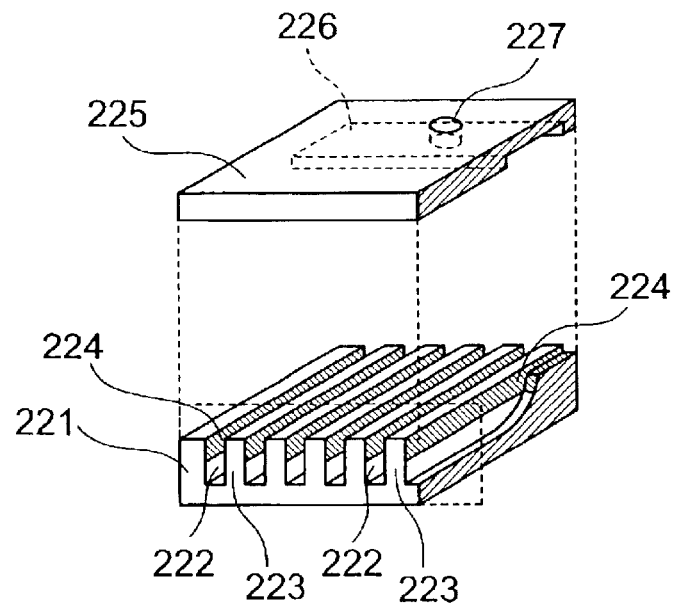

Here, the head chip 220 will be described in detail. As shown in FIG. 7, (FIG. 7A, FIG. 7B) a plurality of grooves 222 are arranged in parallel on, a piezoelectric ceramic plate 221 constituting the head chip 220, and each groove 222 is separated by a side wall 223. One end portion in a longitudinal direction of each groove 222 is extended to one end surface of the piezoelectric ceramic plate 221, but the other end portion does not extend to the other end surface and its depth gradually reduced. In addition, an electrode 224 for applying a driving electric field is formed over the longitudinal direction on an opening side of the groove 222 in the sidewall 223 on both sides in a width direction of each groove 222.

Each groove 222 formed on the piezoelectric ceramic plate 221 if formed by, for example, a disk-like dice cutter, and the part with reduced depth is formed according to a shape of the dice cutter. In addition, the electrode 224 formed in each groove 222 is formed by, for example, publicly-known evaporation from an oblique direction.

In addition, an ink chamber plate 225 is joined on the opening side of the grooves 222 of the piezoelectric ceramic plate 221. The ink chamber plate 225 has a common ink chamber 226 to be a recessed part communicating with the other end portion of each groove 222 with reduced depth and an ink supply port 227 piercing through in the opposite direction of the groove 222 from the bottom of this common ink chamber 226.

Here, in this embodiment, each groove 222 is classified into a group corresponding to each color of black (B), yellow (Y), magenta (M) and cyan (C), and four each of the common ink chamber 226 and the ink supply port 227 are provided, respectively.

In addition, a nozzle plate 228 is joined on an end surface where the groove 22 of the joined body of the piezoelectric ceramic plate 221 and the ink chamber plate 225 is opened, and a nozzle opening 229 is formed in a position of the nozzle plate 228 opposed to each groove 222.

Further, in this embodiment, a nozzle support plate 230 is arranged around the end portion where the groove 222 of the joined body of the piezoelectric ceramic plate 221 and the ink chamber plate 225 is opened. This nozzle support plate 230 is joined with the outside of the end surface of the joined body of the nozzle plate 228, and the chip head 220 is formed by fitting and adhering the nozzle support plate 230 to the outside surface of the nozzle plate 228 and the joined body of the piezoelectric ceramic plate 221 and the ink chamber plate 225.

In addition, in the head chip 220, a not-shown wiring pattern connected to the electrodes 224 is formed at the end portion of the piezoelectric ceramic plate 221, which constitutes the head chip 220 as shown in FIG. 6, on the opposite side of the nozzle opening 229 side, and a flexible cable 232 is joined to this wiring pattern via an anisotropic electrode film 231.

Moreover, the base plate 240 of aluminum is attached to the piezoelectric ceramic plate 221 side and a cover plate 250 is attached to the ink chamber plate 225 side to form the ink-jet head 1 on the rear end side of the nozzle support plate 230 of the joined body of the piezoelectric ceramic plate 221 and the ink chamber plate 225. The base plate 240 and the cover plate 250 are fixed by engaging an engaging shaft 250a of the cover plate 250 with an engaging hole 240a of the base plate 240, and the joined body of the piezoelectric ceramic plate 221 and the ink chamber plate 225 is nipped by both of them. Ink introducing paths 251 communicating with ink supply ports 227 of the ink chamber plate 225, respectively, are provided in the cover plate 250.

Figure 8A:
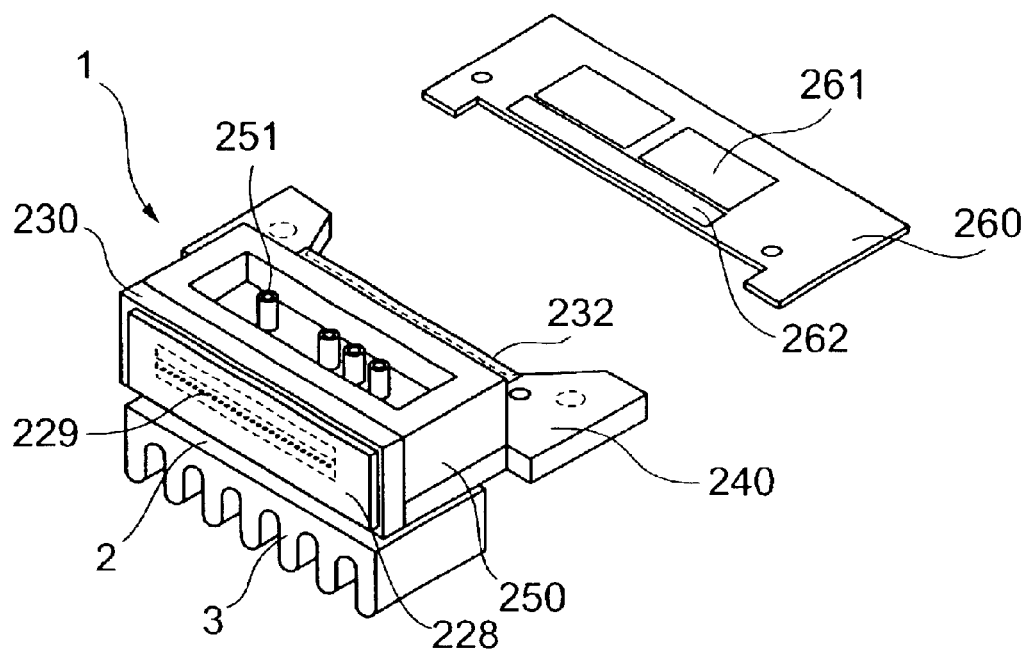
FIGS. 8A and 8B are schematic perspective views of the ink-jet head in accordance with the first embodiment of the present invention.

In addition, as shown in FIG. 8(a), a wiring substrate 260 is fixed to a projecting area of the rear end portion of the base plate 240. Here, a driving circuit for sidewall deformation 261 such as an integrated circuit for driving the head chip 220 is mounted on the wiring substrate 260, and the driving circuit for sidewall deformation 261 and the flexible cable 232 are connected via the anisotropic electrode film 262.

Figure 8B:
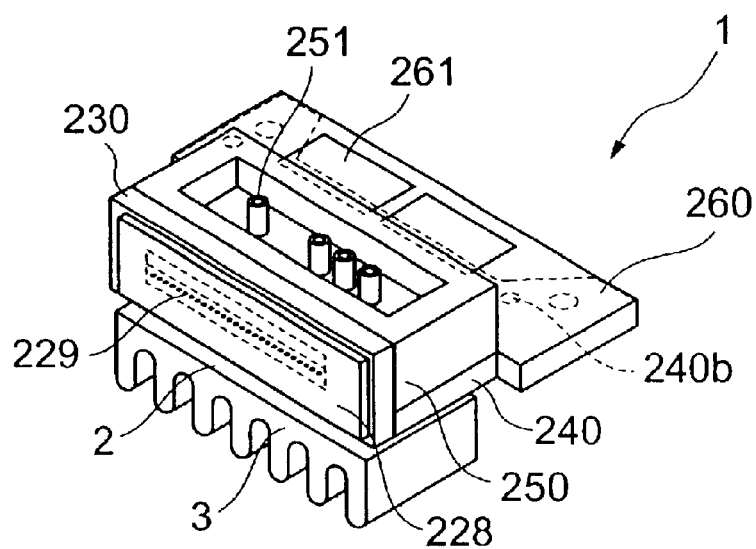

In addition, the above-mentioned thermoelectric module 2 and radiator 3 for heating or cooling the ink-jet head 1 are air-tightly adhered and fixed to the base plate 240 via an adhesive or the like with satisfactory heat conduction. Consequently, the ink-jet head 1 provided with the temperature control device shown in FIG. 8(b) is completed.

In such an ink-jet head 1, ink is filled in each groove 222 from the ink supply port 227 shown in FIG. 7(b) via the ink introducing path 251 and a predetermined driving electric field is generated in the sidewalls 223 on both sides of a predetermined groove 222 via the electrode 224 by the driving circuit for sidewall deformation 261 shown in FIG. 8(a), whereby the sidewalls 223 can be deflectedly deformed to change a capacity in the predetermined groove 222 to discharge the ink in the groove 222 from the nozzle openings 229.

Figure 9A:
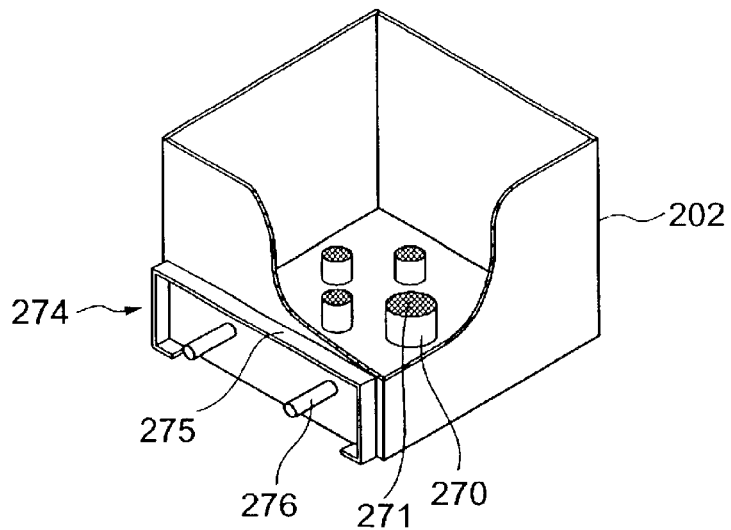
FIGS. 9A and 9B are perspective views showing a process of assembling a head unit using the head chip in accordance with the first embodiment.
Figure 9B:
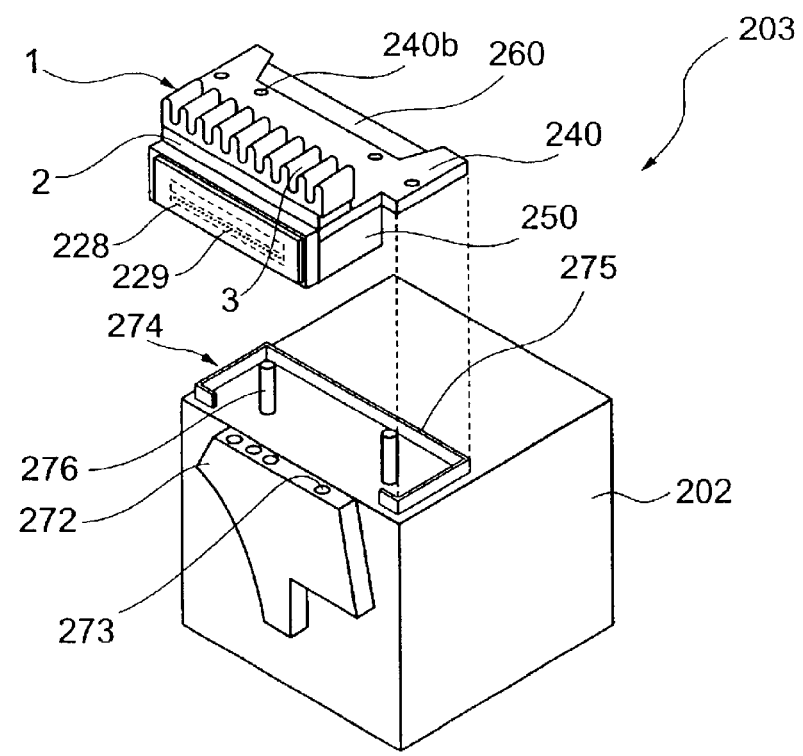

FIG. 9 (FIG. 9A, FIG. 9B) is a perspective view showing an assembly process of a head unit using the ink-jet head in accordance with the first embodiment.

As shown in FIG. 9, (FIG. 9A, FIG. 9B), the tank holder 202 is formed in a substantially box-like shape opened in one side, which can be detachably held by the ink cartridge 201 shown in FIG. 5. In addition, coupling portions 270, which are coupled with ink supply ports that are not-shown opening portions formed in the bottom of the ink cartridge 201, are provided on the upper surface of the bottom wall of the tank holder 202. The coupling portions 270 are provided for ink of each color, for example, black (B), yellow (Y), magenta (M) and cyan (C). Not-shown ink flow paths are formed in the coupling portions 271, and filters 271 are provided at the tips of the coupling portions 270 that are openings of the ink flow paths. In addition, the ink flow paths formed in the coupling portions 270 are formed to communicate to the back surface side of the bottom wall, and each ink flow path communicates with head coupling ports 273 opened in a partition wall of a flow path substrate 272 provided on the back surface side of the tank holder 202 via the not-shown ink flow path in the flow path substrate 272. These head coupling ports 273 are opened on the side surface side of the tank holder 202, and an ink-jet head holding portion 274 for holding the above-mentioned ink-jet head 1 is provided on the bottom of the partition wall. The ink-jet head holding portion 274 is provided with a surrounding wall 275, which is vertically provided in substantially a U shape surrounding the driving circuit for sidewall deformation 261 that is provided on the wiring substrate 260 provided on the rear end portion side of the base plate 240 in which the thermoelectric module 2 and the radiator 3 are air-tightly adhered and fixed, and engaging shafts 276 that are within the surrounding wall 275 and engages with engaging holes 240b provided in the base plate 240 of the ink-jet head 1.

At this point, the ink introducing paths 251 formed in the cover plate 250 shown in FIG. 8 is coupled to the head coupling port 273 of the flow path substrate 272. As the ink cartridge 201 containing ink is inserted in the tank holder 202, ink introduced from the ink cartridge 201 is introduced into the ink introducing paths 251 of the ink-jet head 1 through the ink flow paths in the flow path substrate 272 via the coupling portions 270 of the tank holder 202 and is filled in the common ink chamber 226 and the grooves 222.

Such a head unit 203 is mounted on the carriage 204 of the ink-jet recording apparatus 200 to be used as an ink-jet recording apparatus of a cartridge type, as described above.

Figure 10:
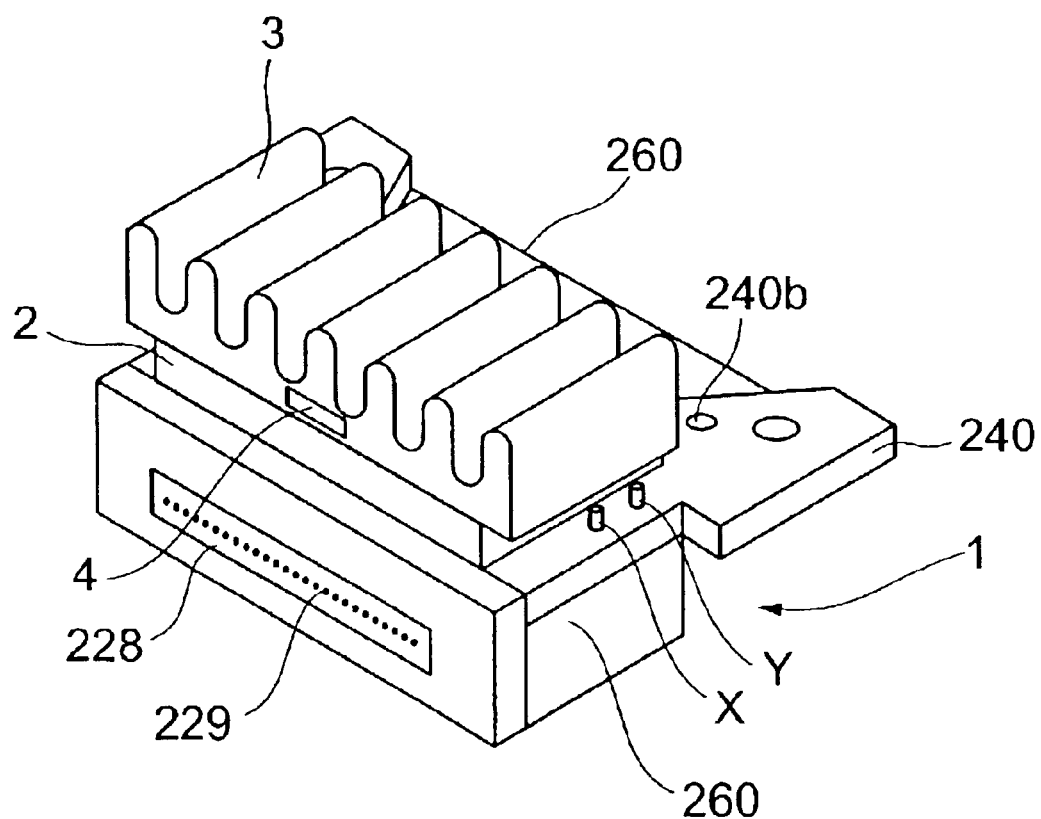
FIG. 10 is a perspective view showing the ink-jet head in accordance with the first embodiment mounted with a thermoelectric module and a radiator.

Here, FIG. 10 is a perspective view showing the ink-jet head in accordance with the first embodiment mounted with a thermoelectric module and a radiator.

Since it is desirable to heat or cool ink immediately before being discharged such that it reaches a predetermined temperature, the thermoelectric module 2 preferably applies temperature control to ink in the vicinity of the nozzle openings 229. Thus, in this embodiment, the thermoelectric module 2 is air-tightly adhered and fixed to a surface of the base plate 240 on the opposite side of the ink-jet head 1 such that temperature control can be applied to the ink in the grooves 222 immediately before discharge.

As shown in the figure, one entire surface of the thermoelectric module 2 is air-tightly adhered and fixed with satisfactory heat conduction to substantially the entire surface of the base plate 240 of the ink-jet head 1 with a heat conductive adhesive, for example, heat conductive plastic elastomer such as heat conductive silicone grease.

On the other hand, the other entire surface of the thermoelectric module 2 adheres and fixes with satisfactory heat conduction to the radiator 3 with an adhesive such as the same heat conductive silicone grease. In addition, the temperature sensor 4 is air-tightly adhered and fixed with satisfactory heat conduction to this radiator 3.

In addition, the terminals X and Y, which are connected to the electrodes provided on the surfaces on both the sides of the thermoelectric module 2, are provided on the surface of the base plate 240 on the side to which the thermoelectric module 2 is joined. As described above, these terminals X and Y are used for detection of a Seebeck voltage generated by temperature difference between both the surfaces of the thermoelectric module 2 via them and, on the contrary, for heating or cooling both the surfaces of the thermoelectric module 2 by flowing a driving current to them.

As is seen from the above-mentioned structure, in the joined portion of the ink-jet head 1 and the thermoelectric module 2, substantially the entire surface is used for adhesion and fixing in order to keep a heat resistance of both of them low. Therefore, if a temperature sensor is attached to the ink-jet head 1 side, a position for attaching the temperature sensor is significantly restricted. Even if the temperature sensor is attached to the end portion of the joined portion, a detected temperature does not reflect an actual temperature of an object of temperature control and is a value containing many errors.

On the other hand, attaching means of the temperature sensor 4 has a degree of freedom on the radiator 3 side, and various means for installing the temperature sensor 4 with low heat resistance are realizable such as adhering and fixing the temperature sensor 4 on the side surface of the radiator 3 using a heat conductive adhesive or providing a hole into which the temperature sensor 4 can be inserted in the side surface of the radiator 3 in advance to enclose the temperature sensor 4 in this hole together with heat conducive silicone grease. Therefore, markedly more accurate temperature detection becomes possible compared with the case in which the temperature sensor is installed on the ink-jet head 1 side. Further, if the radiator 3 is not provided, the temperature sensor 4 may be directly joined with the thermoelectric module 2.

Next, the above-mentioned thermoelectric module 2 will be described in detail.

Figure 11:
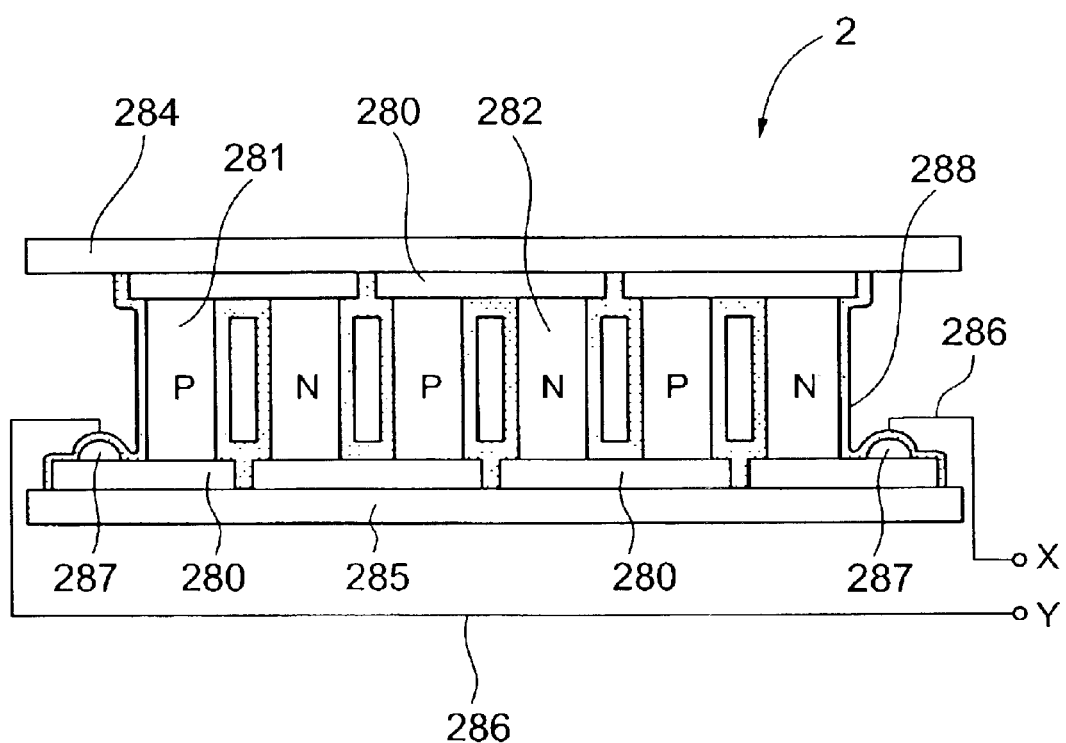
FIG. 11 is a schematic view of a thermoelectric module in accordance with the first embodiment of the present invention.

FIG. 11 is a schematic view of the thermoelectric module in accordance with the first embodiment. As shown in the figure, the thermoelectric module 2 is a thermoelectric module in which a PN junction pair, which is formed by joining a P-type thermoelectric element 281 and an N-type thermoelectric element 282, are formed in series via conductive electrodes 280 of metal or the like. Since this thermoelectric module 2 generates an electromotive force based on the Seebeck effect by giving a temperature difference between the PN junction pairs, in general, it has an application as a power generation device that utilizes a temperature difference. In addition, to the contrary, it has an application as a cooling device, a heating device or the like that utilizes the Peltier effect in which cooling occurs in one joined portion and heat generation occurs in the other joined portion by flowing an electric current to the thermoelectric module 2.

In such a thermoelectric module 2, in general, a plurality of thermoelectric elements are connected in series or in serial parallel to be used in order to improve its performance. As a structure of this thermoelectric module 2, the P-type thermoelectric elements 281 and the N-type thermoelectric elements 282, which have a shape of a rectangular parallelepiped one side of which is several hundred $\mu$m to several mm, are nipped by two electricity insulating first and second substrates 284 and 285 of aluminum or aluminum nitride, and the P-type thermoelectric elements 281 and the N-type thermoelectric elements 282 are connected by the conductive electrodes 280 consisting of a conductive material such as metal in series or in series-parallel on these first and second substrates 284 and 285. Then, both the ends of the connection in series of the P-type thermoelectric elements 281 and the N-type thermoelectric elements 282 are connected to one ends of lead wires 286 by solders 287 and, at the same time, the other ends of the lead wires 286 are connected to the terminals X and Y. Further, the entirety of the P-type thermoelectric elements 281, the N-type thermoelectric elements 282 and the solders 287 is covered by an electrodeposition coating resin layer 288.

The thermoelectric module 2 shown in FIG. 10 has the above-described structure. This thermoelectric module 2 is air-tightly adhered and fixed with satisfactory heat conduction to the base plate 240 of the ink-jet head 1 as described before.

Meanwhile, ink that has flown out of the ink cartridge 201 held in the tank holder 202 is introduced into the ink introducing paths 251 of the ink-jet head 1 through the ink flow paths in the flow path substrate 272 via the coupling portions 270 of the tank holder 202 and is discharged from the nozzle openings 229 via the common ink chamber 226 and the grooves 222. In this ink flow path, the thermoelectric module 2 is air-tightly adhered and fixed to substantially the entire surface of the base plate 240 that is closest to the nozzle openings 229 and can transmit a temperature of ink to the thermoelectric module 2 with a smallest heat resistance, whereby a temperature of the ink immediately before flowing out of the nozzle openings 229 can be transmitted to the thermoelectric module 2 with high accuracy and, at the same time, heat generated by the thermoelectric module 2 can be transmitted to the ink with high accuracy.

In addition, the radiator 3 is air-tightly adhered and joined with satisfactory heat conduction to the other surface of the thermoelectric module 2 and, at the same time, the temperature sensor 4 is attached to the radiator 3 side to which it can be air-tightly adhered and fixed with satisfactory heat conduction rather than directly attaching it to the ink-jet head 1, whereby a temperature of the radiator 3 can be detected with high accuracy and a temperature of ink can be detected accurately.

Next, a temperature control method for the ink-jet head 1 as an example of an object of temperature control will be hereinafter described.

Figure 12:
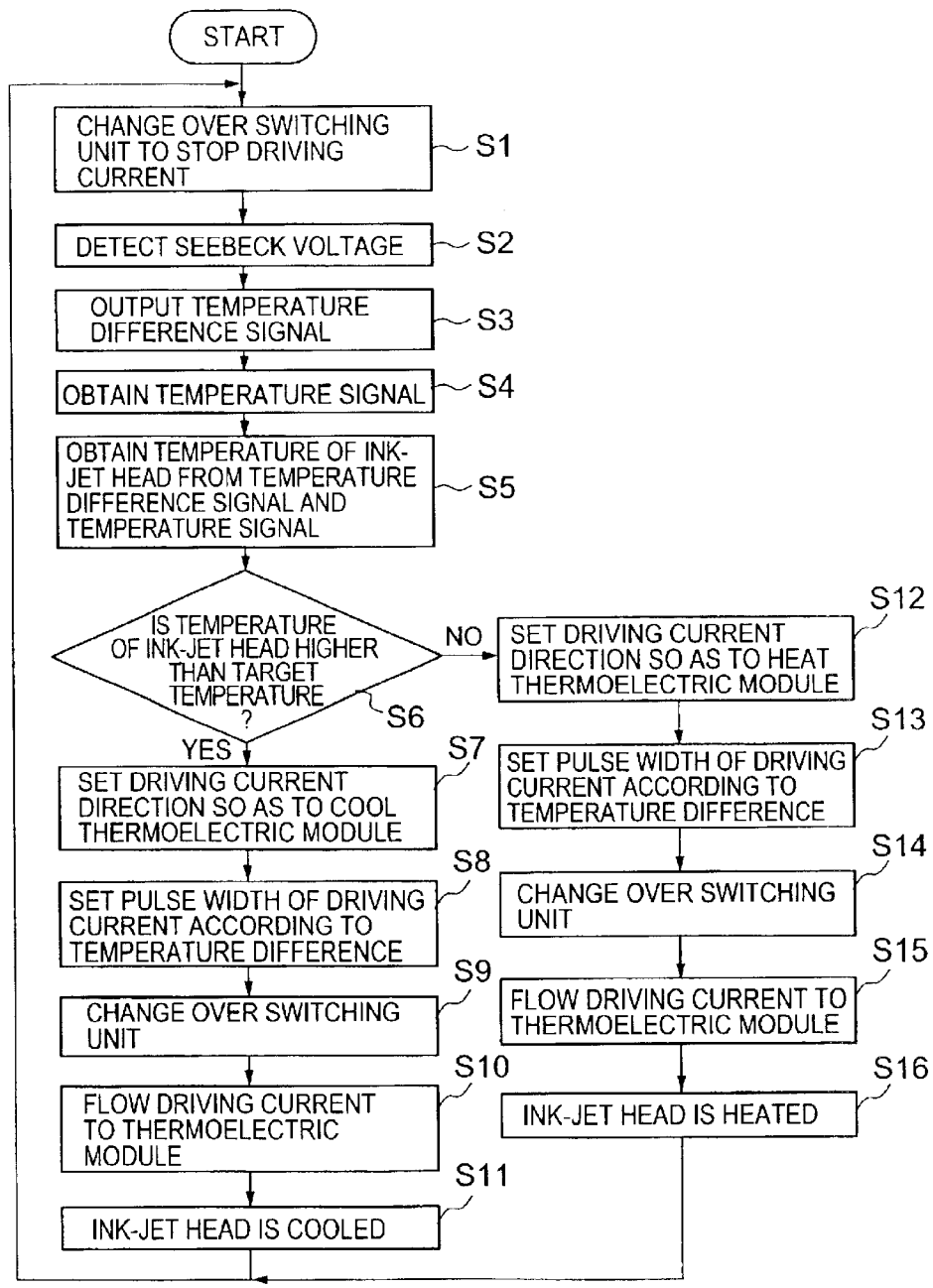
FIG. 12 is a flow diagram of a temperature control method in accordance with the first embodiment of the present invention.
Figure 13:
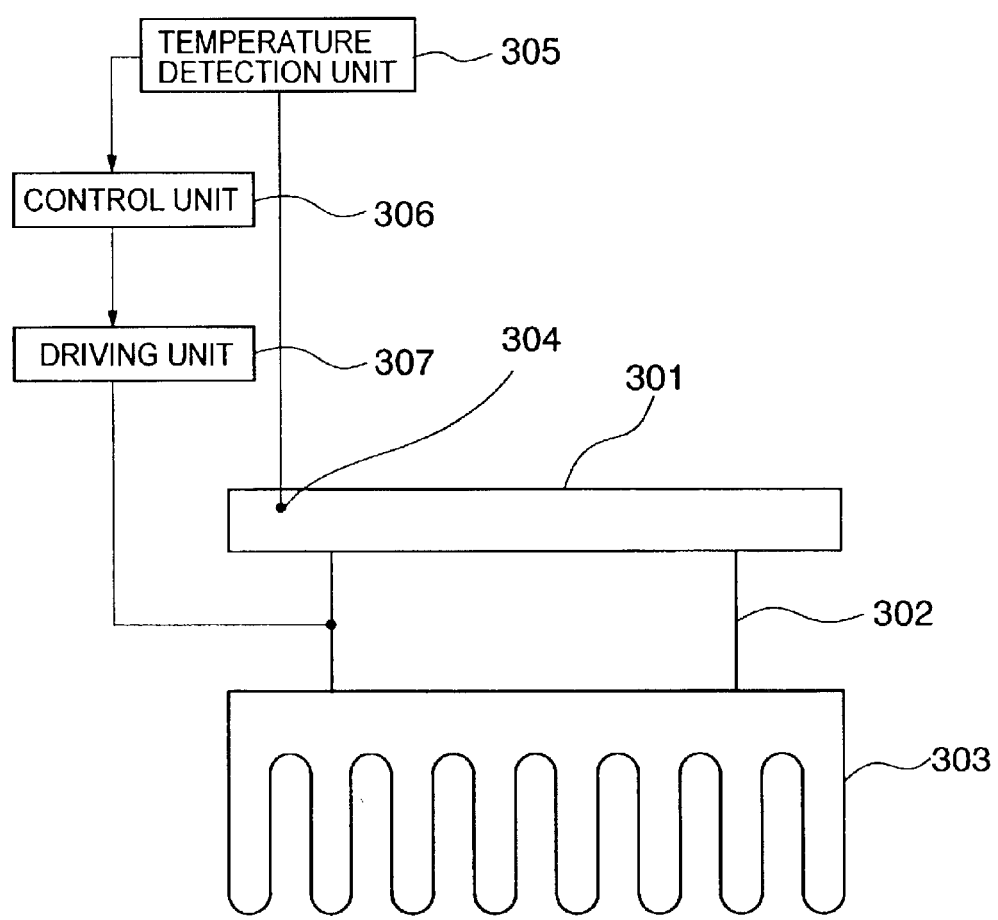
FIG. 13 is a block diagram of a temperature detection device in accordance with a prior art.

FIG. 12 is a flow diagram of a temperature control method by the control circuit 100 in accordance with this embodiment.

As shown in the figure, first, the control circuit 100 changes over the detection switch 61 of the switching unit 60 in step S1 and stops a driving current supplied to the thermoelectric module 2. Consequently, a Seebeck voltage generated by a temperature difference between both the surfaces of the thermoelectric module 2 is detected in the temperature difference detection unit 8 (step S2). In step 3, the temperature difference detection unit 8 generates the temperature difference detection signal $S_1$ representing the temperature difference between both the surfaces of the thermoelectric module 2 from the Seebeck voltage and obtains the signal.

On the other hand, in step S4, the temperature detection unit 5 detects a temperature of the other surface, to which the ink-jet head 1 of the thermoelectric module 2 is not air-tightly adhered and fixed, from the temperature sensor 4 attached to the radiator 3 and obtains the temperature detection signal $S_2$ based on the detected temperature. Then, in step S5, the temperature detection unit 5 obtains a temperature of the ink-jet head 1 from the temperature difference detection signal $S_1$ for both the surfaces of the thermoelectric module 2 and the temperature detection signal $S_2$ for the other surface of the thermoelectric module 2.

Next, the control circuit 100 compares the temperature of the ink-jet head 1 and a target temperature in step S6 and judges whether the temperature of the ink-jet head 1 is higher or lower than the target temperature. If it judges that the temperature of the ink-jet head 1 is higher than the target temperature (step S6: YES), in step S7, the current direction setting circuit 120 sets a direction for flowing a driving current such that the surface of the thermoelectric module 2 on the side to which the ink-jet head 1 is air-tightly adhered and fixed is cooled. In addition, in step S8, the driving pulse generation circuit 130 sets a pulse width of the driving current according to a temperature difference between the temperature of the ink-jet head 1, which is higher than the target temperature, and the target temperature.

Here, the control circuit 100 changes over the detection switch 61 of the switching unit 60 (step S9), stops detection of the Seebeck voltage of the thermoelectric module 2 and flows a driving current for cooling the ink-jet head 1 of the thermoelectric module 2 (step S10). Consequently, the ink-jet head 1 is cooled (step S11).

Thereafter, the control circuit 100 returns to step S1, changes over the switching unit 60 to measure a temperature of the ink-jet head 1 again and shifts to the next control.

On the other hand, in step S6, if the control circuit 100 judges that the temperature of the ink-jet head 1 is lower than the target temperature (step S6: NO), in step S12, the current direction setting circuit 120 sets a direction for flowing a driving current such that the surface of the thermoelectric module 2 on the side to which the ink-jet head 1 is air-tightly adhered is heated. In addition, in step S13, the driving pulse generation circuit 130 sets a pulse width of a driving current according to the temperature difference between the temperature of the ink-jet head 1 and the target temperature.

Here, the control circuit 100 changes over the detection switch 61 of the switching unit 60 (step S14), stops detection of a Seebeck voltage of the thermoelectric module 2 and flows a driving current for heating the ink-jet head 1 of the thermoelectric module 2 (step S15). Consequently, the ink-jet head 1 is heated (step S16).

There after, the control circuit 100 returns to step S1, changes over the switching unit 60 to measure a temperature of the ink-jet head 1 again and shifts to the next control.

According to the temperature control method as described above, since a temperature of ink can be controlled to a target temperature with high accuracy even if an environmental temperature or the like changes, the temperature of ink is appropriately held and a printing quality improves.

(Other Embodiments)

Although the embodiment of the present invention has been described above, a basic structure of a temperature control device is not limited to the above-mentioned one.

For example, in the above-mentioned first embodiment, a thermoelectric module is installed on a surface of a base plate on the opposite side of an ink-jet head. However, the present invention is not limited to this and the thermoelectric module may be provided on a cover plate side of the ink-jet head or may be provided such that an entire head unit can be heated or cooled.

Moreover, the temperature control device of the present invention can be mounted not only on an ink-jet recording apparatus but also on a heat generating surface or a heat exchanger of a control device or a part of a partition wall forming a thermal insulation space of various apparatuses to control an object of temperature control to a target temperature.

As described above, in the present invention, since temperature detecting means is attached to the other surface of a thermoelectric module where a temperature can be detected accurately, temperature detection can be applied with high accuracy to an object of temperature control to which the temperature detecting means cannot be air-tightly adhered and fixed with satisfactory heat conduction due to its shape and dimension. Therefore, since highly accurate temperature detection becomes possible and viscosity of ink can be held appropriately, a printing quality improves.

In addition, an object of temperature control that must be detachable from a main body of an apparatus for repair can be easily attached to and detached from the main body because the temperature detecting means does not need to be provided in the object of temperature control.

Moreover, as to an object of temperature control for which it is necessary to attach a cover for preventing condensation or preventing dust and the like, there are various effects such as causing no hindrance even if a cover is attached to the object of temperature control because the temperature detecting means is not provided in the object of temperature control.

What is claimed is:

1. A temperature control device, comprising: a thermoelectric module having opposing first and second surfaces; an ink-jet head adhered to the first surface of the thermoelectric module in an air-tight manner; driving means for supplying a driving current to the thermoelectric module; temperature difference detecting means for, obtaining a Seebeck voltage generated from a temperature difference between the first and second surfaces of the thermoelectric module when the driving current is not flowing and outputting a temperature difference signal; a temperature sensor thermally coupled to the second surface of the thermoelectric module; temperature detecting means for outputting a temperature detection signal based on a signal of the temperature sensor; and controlling means for controlling the driving means to set the ink-jet head to a target temperature according to the temperature detection signal and the temperature difference signal.

2. A temperature control device according to claim 1; further comprising switching means for alternately switching a connection state of the thermoelectric module and the driving means and a connection state of the thermoelectric module and the temperature difference detecting means.

3. A temperature control device according to claim 1; wherein the controlling means controls an amount and a direction of the driving current that the driving means supplies to the thermoelectric module.

4. A temperature control device according to claim 1; further comprising a radiator adhered to the second surface of the thermoelectric module in an air-tight manner.

5. A temperature control device according to claim 1; wherein the thermoelectric module comprises P-type thermoelectric elements and N-type thermoelectric elements connected to each other in series or in serial parallel.

6. An ink-jet recording apparatus having the temperature control device according to claim 1.

7. A temperature control method for controlling a temperature of a device having an ink-jet head air-tightly adhered to a first surface of a thermoelectric module, and which supplies a driving current to the thermoelectric module to control the ink-jet head to reach a target temperature, comprising the steps of:

detecting a temperature of a second surface of the thermoelectric module opposite the first surface while obtaining a temperature difference from a Seebeck voltage generated from a temperature difference between the first and second surfaces of the thermoelectric module while the driving current is not being supplied to the thermoelectric module; and controlling a temperature of the ink-jet head to reach a target temperature by controlling a direction and an amount of the driving current flown to the thermoelectric module according to the temperature difference between the first and second surfaces of the thermoelectric module and the temperature of the second surface.

8. A temperature control method according to claim 7; wherein the steps of obtaining a temperature difference from a Seebeck voltage and supplying the driving current to the thermoelectric module are alternately repeated.

9. A temperature control method according to claim 7; wherein the device further comprises a radiator air-tightly adhered to the second surface of the thermoelectric module.

10. A temperature control method according to claim 7; wherein the thermoelectric module comprises a P-type thermoelectric elements and N-type thermoelectric elements connected in series or in serial parallel.

11. A temperature control device for a printer, comprising: a thermoelectric module having opposing first and second surfaces; a print head in contact with the first surface of the thermoelectric module; a driving unit for supplying a driving current to the thermoelectric module; a temperature difference detecting unit for obtaining a temperature difference between the first and second surfaces of the thermoelectric module and outputting a temperature difference signal; a temperature sensor thermally coupled to the second surface of the thermoelectric module; a temperature detection unit for outputting a temperature detection signal based on an output signal of the temperature sensor; and a control unit for controlling the driving unit to set the print head to a target temperature according to the temperature detection signal and the temperature difference signal.

12. A temperature control device according to claim 11; wherein the temperature difference detecting unit obtains a Seebeck voltage generated from a temperature difference between the first and second surfaces of the thermoelectric module when the driving current is not flowing.

13. A temperature control device according to claim 11; further comprising a switching circuit for alternately switching a connection state of the thermoelectric module and the driving unit and a connection state of the thermoelectric module and the temperature difference detecting unit.

14. A temperature control device according to claim 11; wherein the control unit controls an amount and a direction of the driving current that the driving unit supplies to the thermoelectric module.

15. A temperature control device according to claim 11; further comprising a heat sink adhered to the second surface of the thermoelectric module in an air-tight manner.

16. A temperature control device according to claim 11; wherein the thermoelectric module comprises P-type thermoelectric elements and N-type thermoelectric elements connected to each other in series or in serial parallel.

17. A temperature control device according to claim 11; wherein the a print head is adhered to the first surface of the thermoelectric module in an air-tight manner.

18. An ink-jet recording apparatus having the temperature control device according to claim 11.

* * * * *